United States Patent
Yeh et al.

(10) Patent No.: US 7,426,107 B2
(45) Date of Patent: Sep. 16, 2008

(54) ELECTRONIC DEVICE HAVING AN ADJUSTABLE DISPLAY AREA

(75) Inventors: Chih-Feng Yeh, Hsichih (TW); Hung-Shen Yang, Hsichih (TW)

(73) Assignee: Wistron Corporation, Taipei Hsien (TW)

( * ) Notice: Subject to any disclaimer, the term of this patent is extended or adjusted under 35 U.S.C. 154(b) by 508 days.

(21) Appl. No.: 11/264,123

(22) Filed: Nov. 1, 2005

(65) Prior Publication Data

US 2006/0166713 A1 Jul. 27, 2006

(30) Foreign Application Priority Data

Jan. 25, 2005 (TW) .............................. 94102131 A (51) Int. Cl.
  *G06F 1/16* (2006.01)
(52) U.S. Cl. .................... 361/681; 455/575.1; 455/566; 345/170; 345/168; 340/815.83; 340/815.4
(58) Field of Classification Search ................. 361/681; 455/575.1; 340/815.83, 815.4
  See application file for complete search history.

(56) References Cited

U.S. PATENT DOCUMENTS

| | | | |
|---|---|---|---|
| 6,498,597 B1 * | 12/2002 | Sawano | 345/107 |
| 6,680,724 B2 * | 1/2004 | Lichtfuss | 345/102 |
| 6,762,929 B2 * | 7/2004 | Sawyer | 361/681 |
| 7,050,835 B2 * | 5/2006 | Hack et al. | 455/566 |
| 7,158,111 B1 * | 1/2007 | Jackson et al. | 345/107 |
| 7,196,692 B2 * | 3/2007 | Mochizuki et al. | 345/168 |
| 7,310,050 B2 * | 12/2007 | Yeh | 340/815.83 |
| 2001/0003450 A1 * | 6/2001 | Hemia et al. | 345/170 |
| 2002/0118151 A1 * | 8/2002 | Chen | 345/84 |
| 2003/0048256 A1 * | 3/2003 | Salmon | 345/168 |
| 2005/0040962 A1 * | 2/2005 | Funkhouser et al. | 340/815.4 |
| 2005/0041012 A1 * | 2/2005 | Daniel et al. | 345/156 |
| 2005/0174366 A1 * | 8/2005 | Wu et al. | 345/905 |
| 2005/0176470 A1 * | 8/2005 | Yamakawa | 455/566 |
| 2006/0034039 A1 * | 2/2006 | Van Rens | 361/681 |
| 2006/0038745 A1 * | 2/2006 | Naksen et al. | 345/30 |
| 2006/0192726 A1 * | 8/2006 | Huitema et al. | 345/1.1 |

* cited by examiner

*Primary Examiner*—Lisa Lea-Edmonds
(74) *Attorney, Agent, or Firm*—Merchant & Gould P.C.

(57) ABSTRACT

An electronic device includes a flexible display panel having an intermediate extended display section that interconnects a normal display end section fitted in a panel-mounting frame movable along an outer surface of a housing, and a coupling end section disposed in the housing, that extends through a vertical slot in the housing, and that is guided around a guide roller. The normal display end section of the display panel serves as a normal display area when the panel-mounting frame is positioned at a normal position by a positioning unit. The normal display end section and the intermediate extended display section serve as an enlarged display area when the panel-mounting frame is positioned at an extended position. A biasing unit biases the intermediate extended display section to move into the housing.

8 Claims, 8 Drawing Sheets

ELECTRONIC DEVICE HAVING AN ADJUSTABLE DISPLAY AREA

CROSS-REFERENCE TO RELATED APPLICATION

This application claims priority of Taiwanese Application No. 094102131, filed on Jan. 25, 2005.

BACKGROUND OF THE INVENTION

1. Field of the Invention

The invention relates to an electronic device, more particularly to an electronic device having an adjustable display area.

2. Description of the Related Art

The design of an electronic device, such as a mobile phone, a personal digital assistant, a multi-media player, etc., has a current trend toward compactness and low power consumption.

For a conventional electronic device having a compact size, there is provided a limited display area such that the conventional electronic device cannot meet user's visual requirements when functioning as a multi-media player. Furthermore, the conventional electronic device includes an inflexible liquid crystal display panel with need for a backlight, thereby interfering with compact design.

SUMMARY OF THE INVENTION

Therefore, the object of the present invention is to provide an electronic device having an adjustable display area.

According to the present invention, an electronic device comprises:

a housing configured with a receiving space and having a front wall, the front wall having opposite first and second lateral sides and being formed with an elongate vertical slot that is in spatial communication with the receiving space and that is disposed adjacent to the first lateral side of the front wall, the front wall being formed with an outer surface having a rectangular window area;

a panel-mounting frame movable along the outer surface of the front wall of the housing in a horizontal direction between a normal position, where the panel-mounting frame is fully located in the window area of the outer surface of the front wall of the housing, and an extended position, where a part of the panel-mounting frame extends outwardly from the window area of the outer surface of the front wall of the housing;

an elongate guide roller journalled in the receiving space and disposed parallel and adjacent to the vertical slot in the front wall;

a flexible display panel having a normal display end section fitted in the panel-mounting frame, a coupling end section opposite to the normal display end section and disposed in the receiving space, and an intermediate extended display section interconnecting the normal display end section and the coupling end section, extending through the vertical slot in the front wall and guided around the guide roller;

a biasing unit including a torsion spring disposed in the housing and fastened to the coupling end section of the flexible display panel for biasing the intermediate extended display section to move into the receiving space in the housing; and a positioning unit provided on the panel-mounting frame and the housing for positioning the panel-mounting frame at the normal position and the extended position.

The normal display end section of the flexible display panel serves as a normal display area configured to display an image thereon when the panel-mounting frame is positioned at the normal position. The intermediate extended display section of the flexible display panel extends into the window area of the outer surface of the front wall of the housing when the panel-mounting frame is positioned at the extended position such that the normal display end section and the intermediate extended display section of the flexible display panel serve as an enlarged display area configured to display an image thereon.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Referring to FIGS. 1 to 4 and 7, the first preferred embodiment of an electronic device according to the present invention is shown to include a housing 1, a panel-mounting frame 6, an elongate guide roller 2, a flexible display panel 3, a biasing unit 5, and a positioning unit. The electronic device is a personal digital assistant in this embodiment, but can also be embodied as a mobile phone, a multi-media player, etc.

Figure 2:
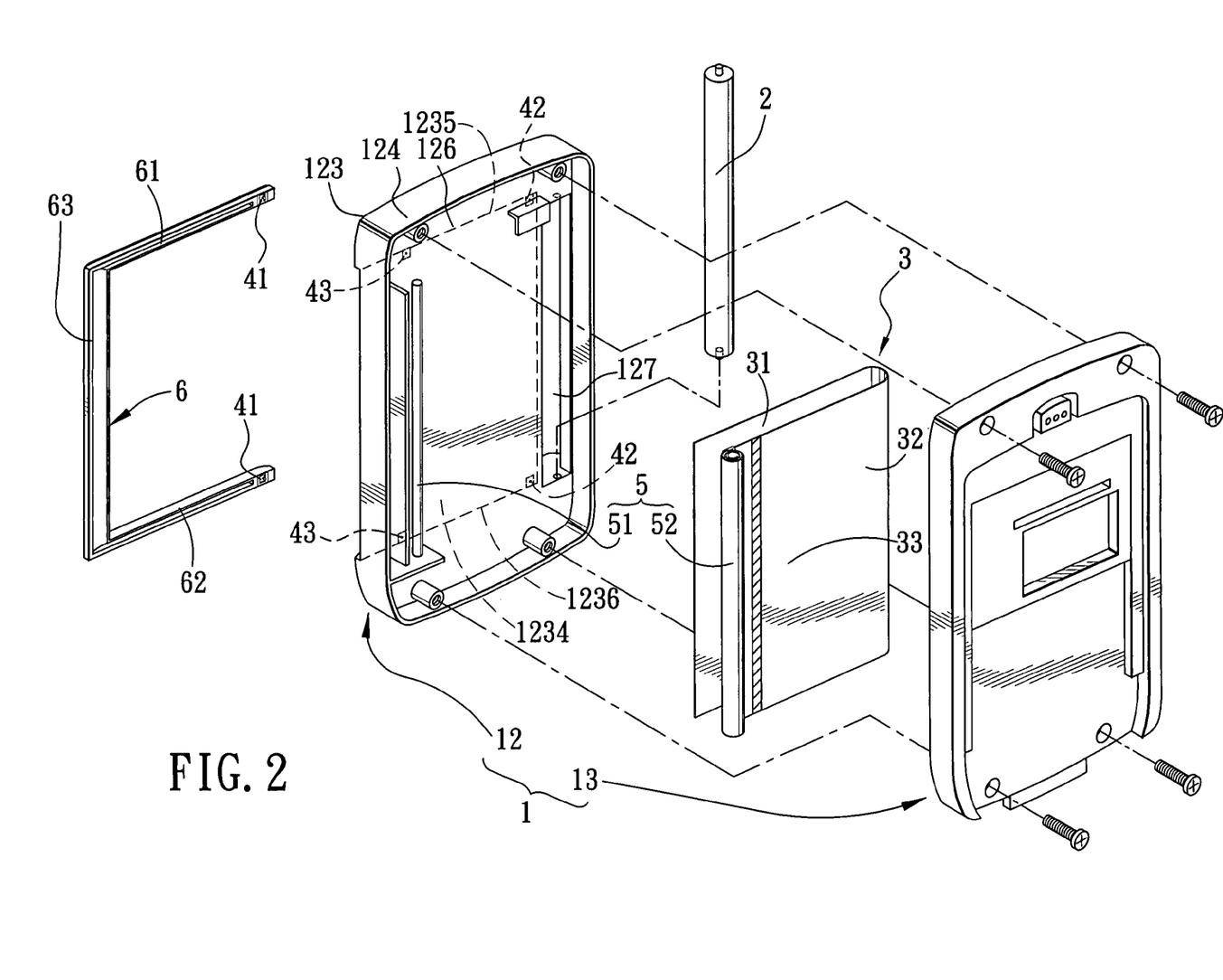
FIG. 2 is an exploded perspective view of the first preferred embodiment.
Figure 3:
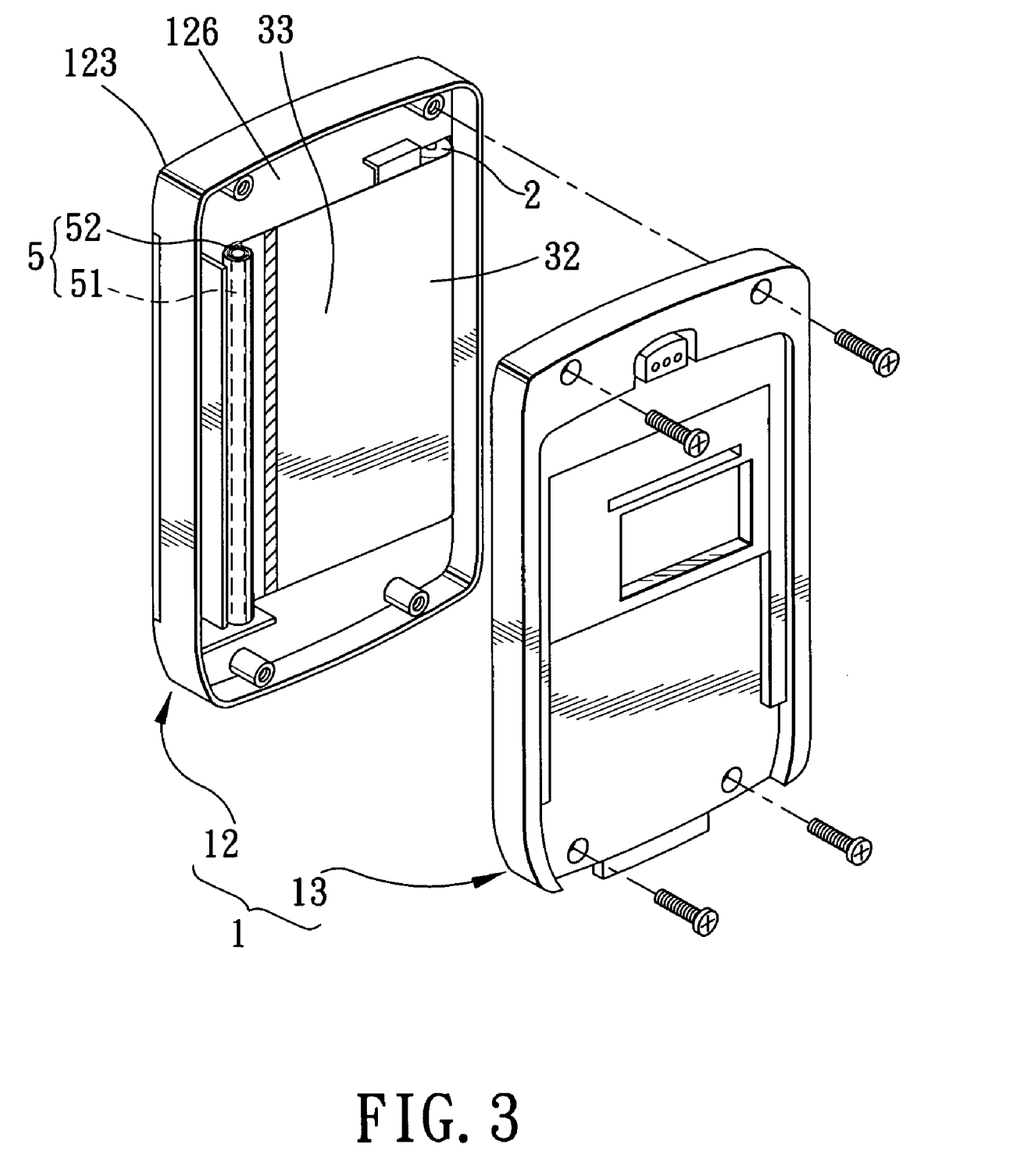
FIG. 3 is a partly exploded perspective view of the first preferred embodiment.
Figure 4:
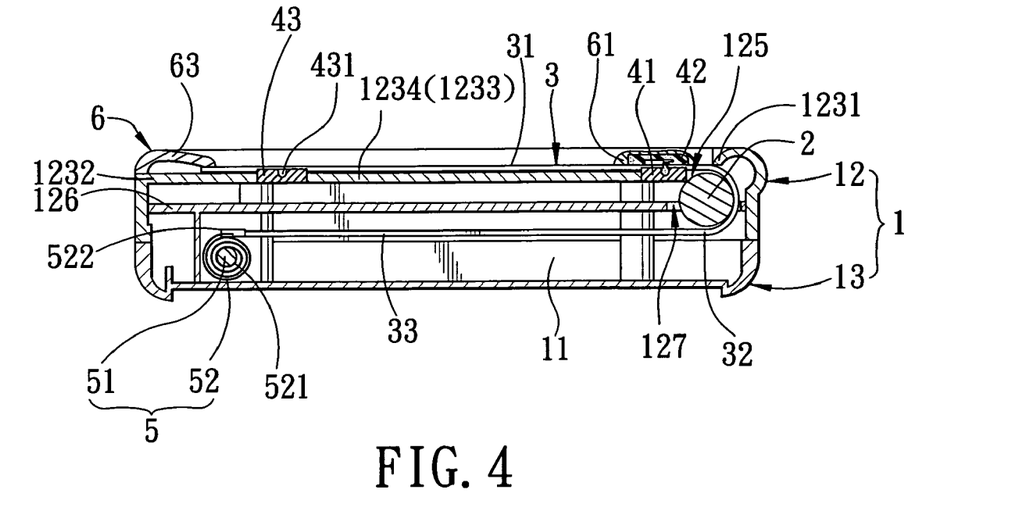
FIG. 4 is a schematic sectional view of the first preferred embodiment taken along line IV-IV in FIG. 1.

As shown in FIG. 2, in this embodiment, the housing 1 consists of complementary front and rear casing parts 12, 13 connected to each other and defining a receiving space 11 (see FIG. 4) therebetween. The front casing part 12 has a front wall 123. The front wall 123 has opposite first and second lateral sides 1231, 1232, and is formed with an elongate vertical slot 125 that is in spatial communication with the receiving space 11 and that is disposed adjacent to the first lateral side 1231 of the front wall 123, as shown in FIG. 4. The front wall 123 is formed with an outer surface 1233 having a rectangular window area 1234, as shown in FIGS. 2 and 4. In this embodiment, the housing 1 further includes a partition wall 126 fixed in the front casing part 12 and disposed parallel to the front wall 123. The partition wall 126 is formed with an elongate vertical slot 127 registered with the vertical slot 125 in the front wall 123, as best shown in FIG. 4.

Figure 8:
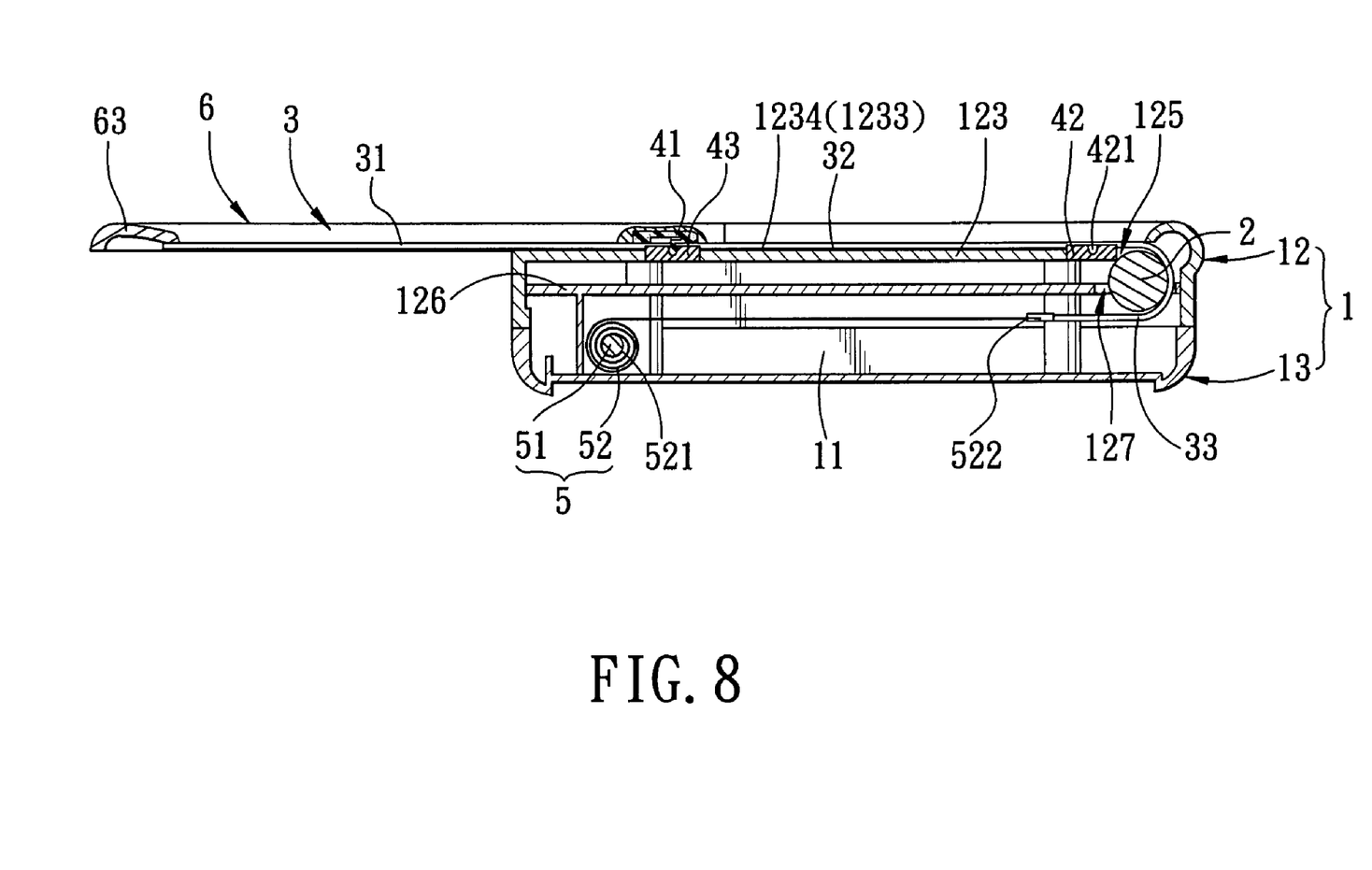
FIG. 8 is a schematic sectional view of the first preferred embodiment taken along line VIII-VIII in FIG. 6.

The panel-mounting frame 6 is movable along the outer surface 1233 of the front wall 123 of the housing 1 in a horizontal direction between a normal position, where the panel-mounting frame 6 is fully located in the window area 1234 of the outer surface 1233 of the front wall 123, as best shown in FIG. 4, and an extended position, where a part of the panel-mounting frame 6 extends outwardly from the window area 1234 of the outer surface 1233 of the front wall 123 of the housing 1, as best shown in FIG. 8. Referring to FIGS. 2 and 4, in this embodiment, the panel-mounting frame 6 has parallel upper and lower frame portions 61, 62 disposed respectively at upper and lower sides 1235, 1236 of the window area 1234, and a handgrip frame portion 63 interconnecting corresponding ends of the upper and lower frame portions 61, 62 and disposed adjacent to the second lateral side 1232 of the front wall 123.

The guide roller 2 is journalled in the receiving space 11 and the vertical slot 127 in the partition wall 126, and is disposed parallel and adjacent to the vertical slot 125 in the front wall 123, as best shown in FIG. 4.

Referring to FIGS. 2 and 4, the flexible display panel 3 has a normal display end section 31 fitted in the panel-mounting frame 6, a coupling end section 33 opposite to the normal display end section 31 and disposed in the receiving space 11, and an intermediate extended display section 32 interconnecting the normal display end section 31 and the coupling end section 33, extending through the vertical slot 125 in the front wall 123 and the vertical slot 127 in the partition wall 126, and guided around the guide roller 2. In this embodiment, the flexible display panel is an organics light-emitting display panel 3 that does not need a backlight and that is lighter, thinner and smaller as compared to a liquid crystal display panel, thereby resulting in lower production costs. It is noted that, in order to ensure a uniform stress distribution for the flexible display panel 3, the flexible display panel 3 preferably has a minimum bend radius that approximates a curvature radius of the guide roller 2.

Referring to FIG. 4, the biasing unit 5 includes a vertical rod 51 mounted fixedly in the receiving space 11 and spaced apart from the guide roller 2, and a torsion spring 52, such as a spiral spring, wound on the vertical rod 51, and having a first end 521 fastened to the vertical rod 51, and a second end 522 opposite to the first end 521 and fastened to the coupling end section 33 of the flexible display panel 3 for biasing the intermediate extended display section 32 of the flexible display panel 3 to move into the receiving space 11 in the housing 1.

Figure 5:
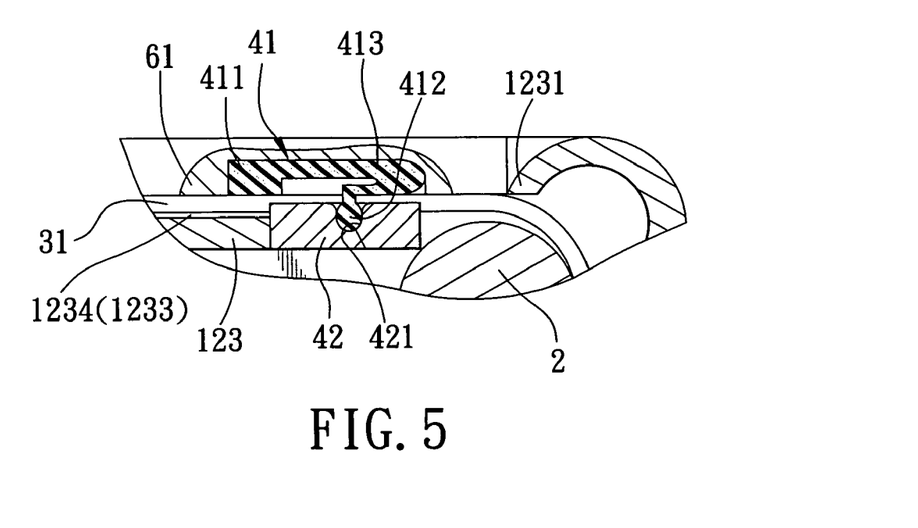
FIG. 5 is a fragmentary enlarged schematic sectional view of FIG. 4.

The positioning unit is provided on the panel-mounting frame 6 and the housing 1 for positioning the panel-mounting frame 6 at the normal position and the extended position. Referring further to FIGS. 5 and 8, in this embodiment, the positioning unit includes a pair of resilient engaging members 41, a pair of first engaging grooves 421, and a pair of second engaging grooves 431.

The resilient engaging members 41 are formed respectively on the upper and lower frame portions 61, 62 of the panel-mounting frame 6. Each engaging member 41 has a base 411 mounted fixedly on a corresponding one of the upper and lower frame portions 61, 62, and a stub 412 extending from the base 411 toward the outer surface 1233 of the front wall 123 of the housing 1. In this embodiment, the base 411 of each engaging member 41 has a resilient bent rod section 413 connected integrally to the stub 412, as best shown in FIG. 5.

In this embodiment, each first engaging groove 421 is formed in a block 42 mounted fixedly on the outer surface 1233 of the front wall 123 of the housing 1 and disposed adjacent to the first lateral side 1231 of the front wall 123 of the housing 1 (the upper first engaging groove 421 is best shown in FIG. 5). With additional reference to FIG. 2, the first engaging grooves 421 are disposed respectively adjacent to the upper and lower sides 1235, 1236 of the window area 1234. The first engaging grooves 421 respectively engage the stubs 412 of the engaging members 41 when the panel-mounting frame 6 is moved to the normal position (the upper first engaging groove 421 engaging the stub 412 of the upper engaging member 41 is shown in FIG. 5).

In this embodiment, the second engaging grooves 431 are similar to the first engaging grooves 421. Each second engaging groove 431 is formed in a block 43 mounted fixedly on the outer surface 1233 of the front wall 123, and is adjacent to the second lateral side 1232 of the front wall 123 (the upper second engaging groove 431 is shown in FIG. 5). The second engaging grooves 431 are disposed respectively adjacent to the upper and lower sides 1235, 1236 of the window area 1234. The second engaging grooves 431 respectively engage the stubs 412 of the engaging members 41 when the panel-mounting frame 6 is moved to the extended position (the upper second engaging groove 431 engaging the stub 412 of the upper engaging member 41 is shown in FIG. 8).

Figure 1:
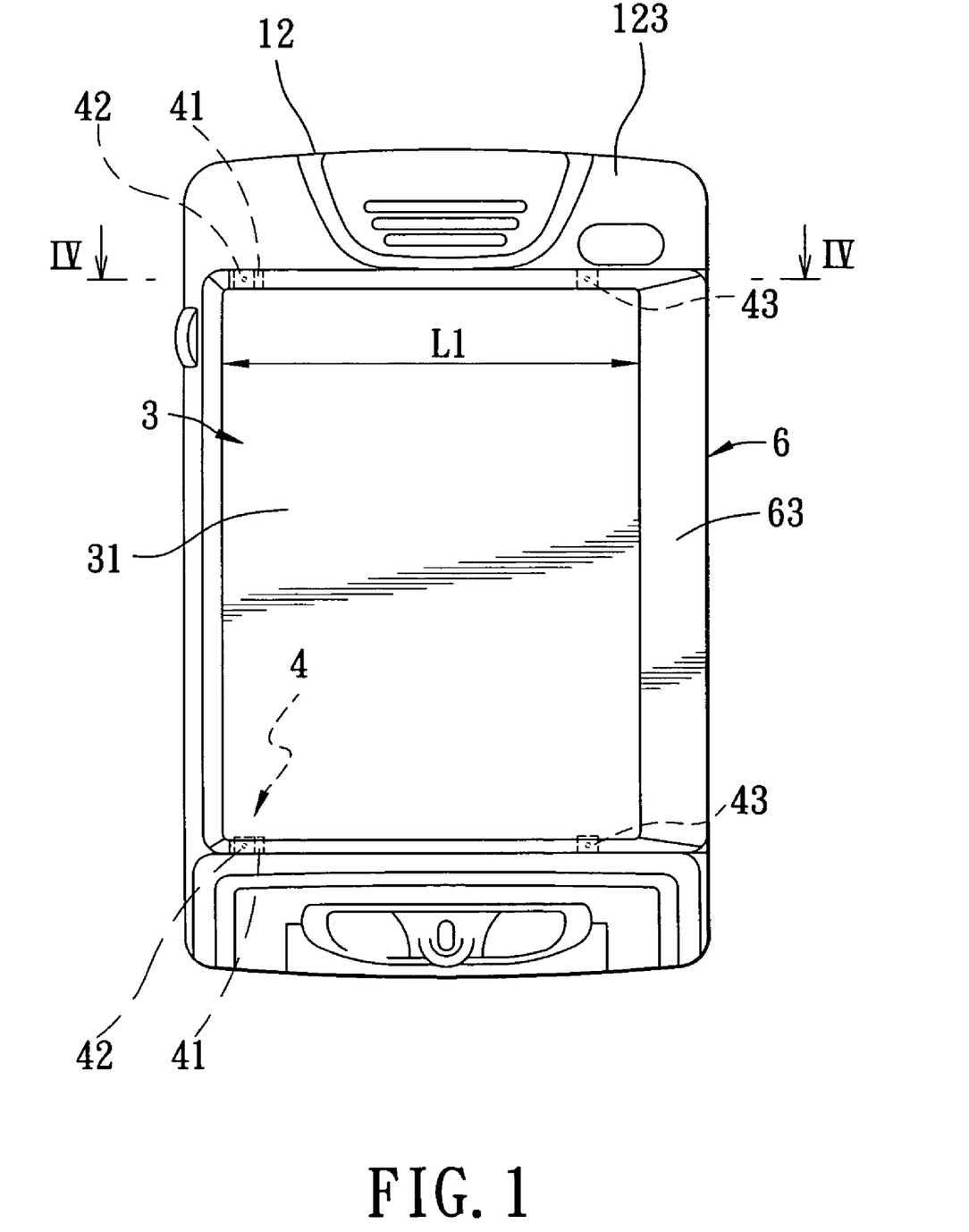
FIG. 1 is a schematic front view showing the first preferred embodiment of an electronic device according to the present invention.

With such a configuration, as shown in FIG. 1, the normal display end section 31 of the flexible display panel 3 serves as a normal display area having a width (L1) and configured to display an image thereon when the panel-mounting frame 6 is positioned at the normal position. It is noted that, preferably, a distance between each first engaging groove 421 and a respective second engaging groove 431 is not greater than $$\frac{3}{4}L1.$$

Figure 6:
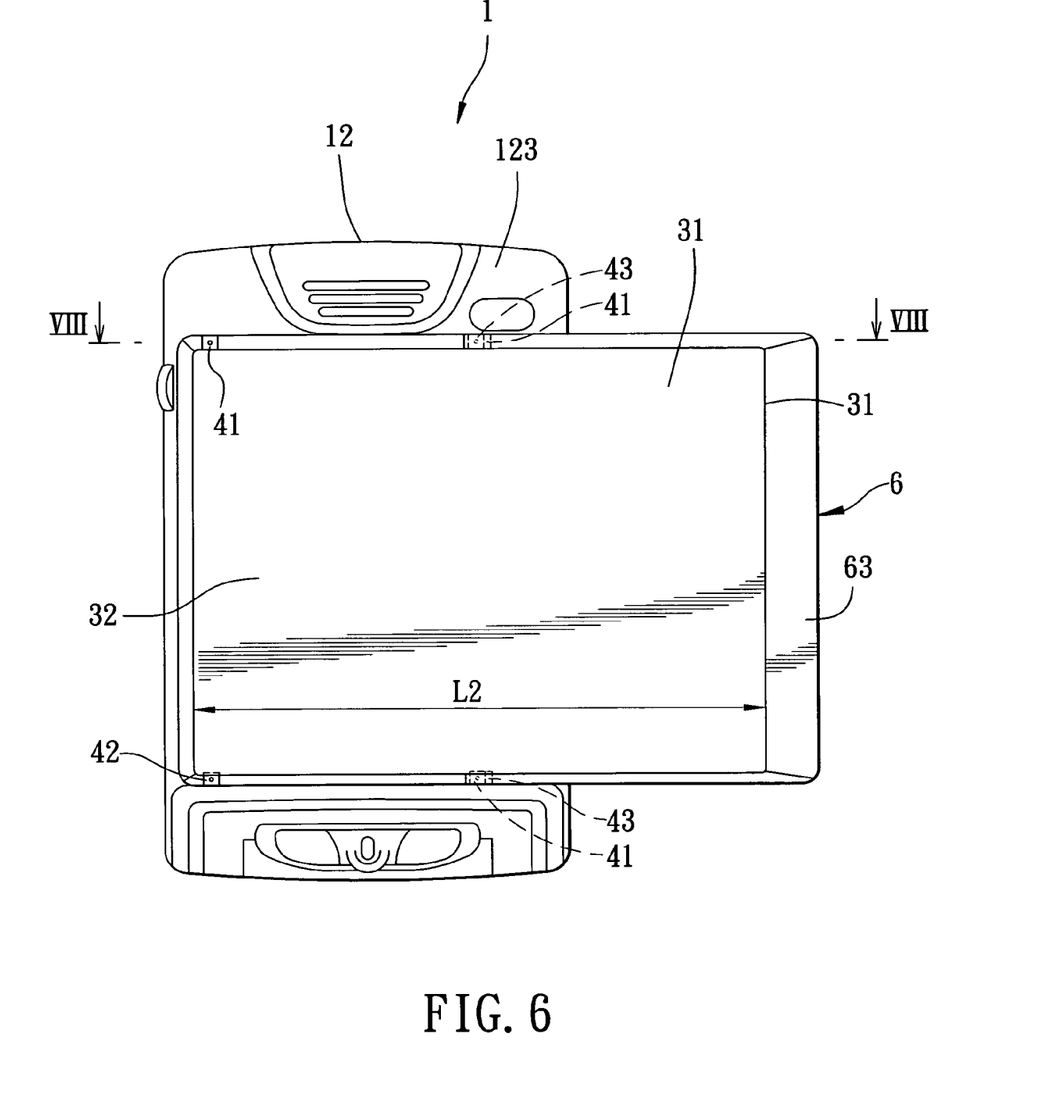
FIG. 6 is a schematic front view showing the first preferred embodiment when a panel-mounting frame is at an extended position.
Figure 7:
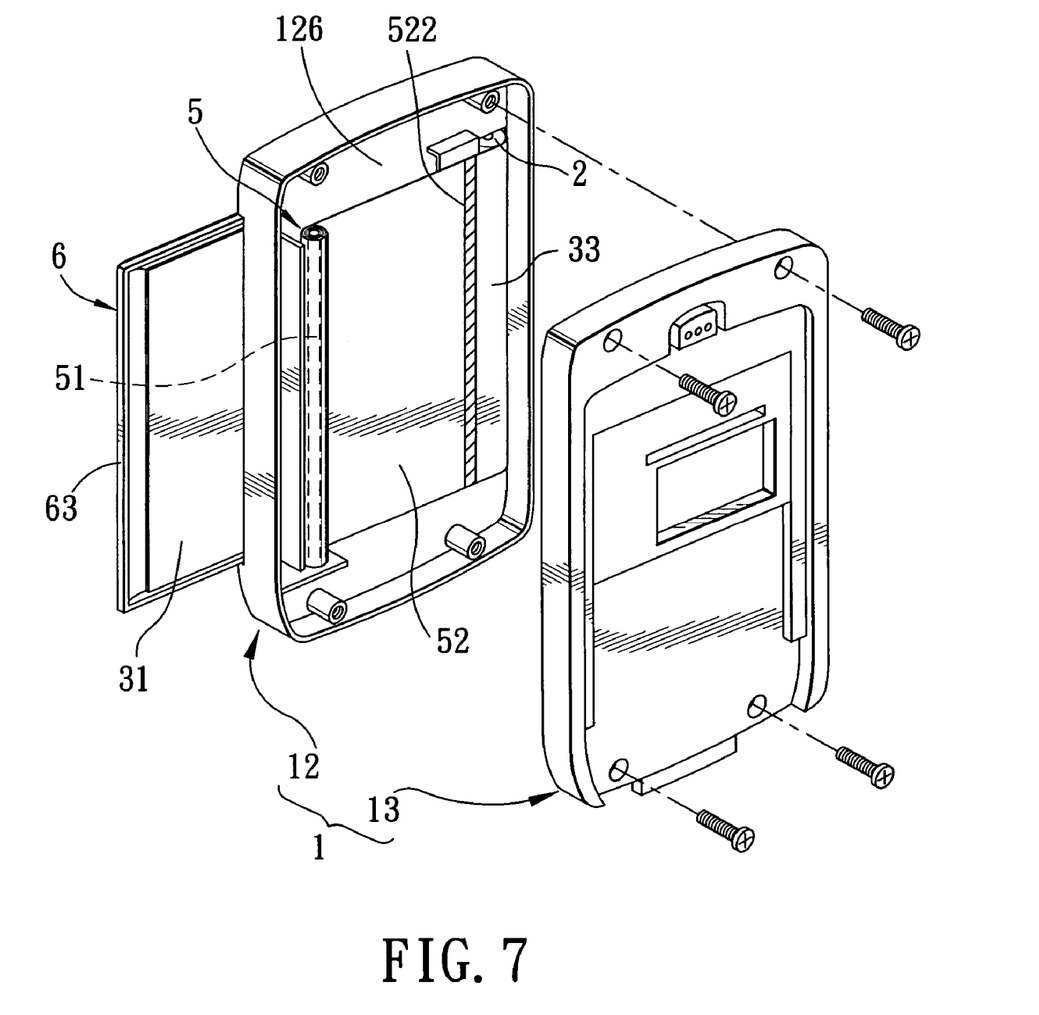
FIG. 7 is a partly exploded perspective view showing the first preferred embodiment when the panel-mounting frame is at the extended position.

On the other hand, as shown in FIGS. 6 and 8, the intermediate extended display section 32 of the flexible display panel 3 extends into the window area 1234 of the outer surface 1233 of the front wall 123 when the panel-mounting frame 6 is positioned at the extended position such that the normal display end section 31 and the intermediate extended display section 32 of the flexible display panel 3 serve as an enlarged display area having a width (L2) greater than the width (L1) and configured to display an image thereon. The object of the invention is thus met.

Figure 9:
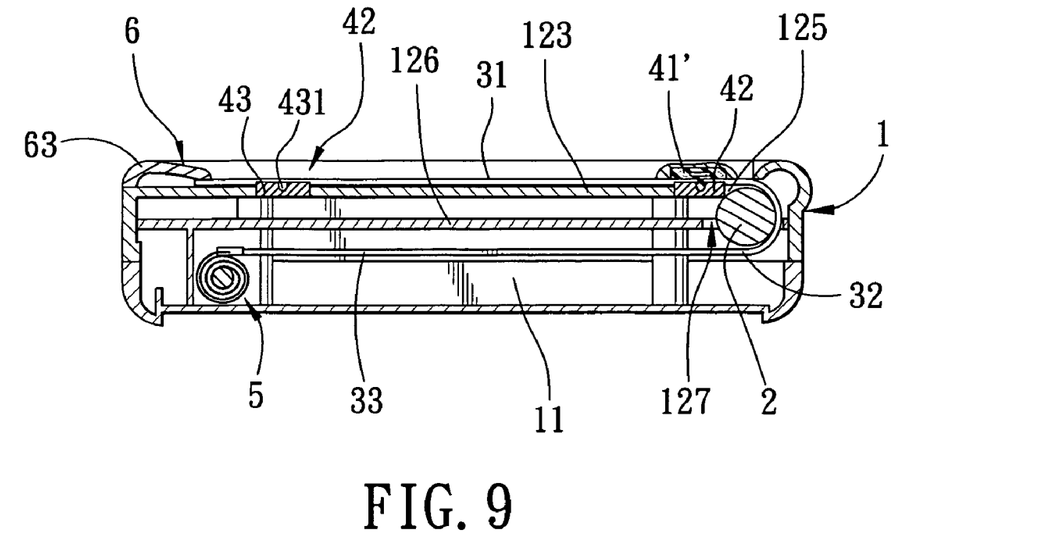
FIG. 9 is a schematic sectional view showing the second preferred embodiment of an electronic device according to the present invention.
Figure 10:
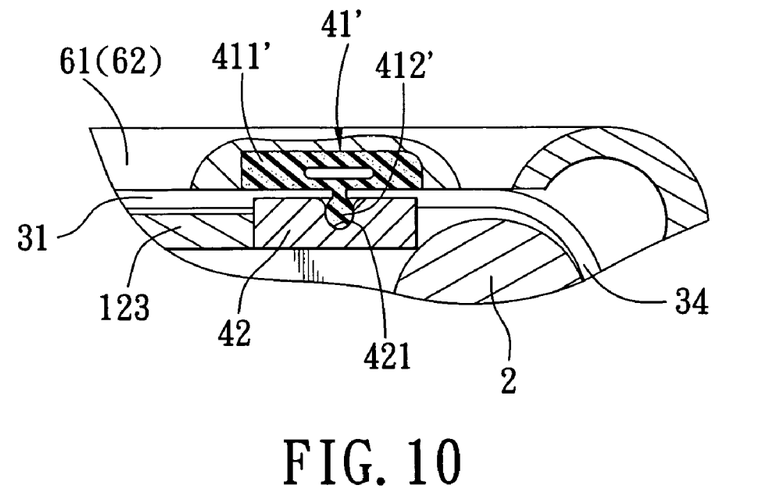
FIG. 10 is a fragmentary enlarged schematic sectional view of FIG. 9.

FIGS. 9 and 10 illustrate the second preferred embodiment of an electronic device according to this invention, which is a modification of the first preferred embodiment. Unlike the previous embodiment, the base 411' of each of the engaging members 41' is hollow such that resilient movement of the corresponding stub 412' is allowed.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. An electronic device comprising:
   a housing configured with a receiving space and having a front wall, said front wall having opposite first and second lateral sides and being formed with an elongate vertical slot that is in spatial communication with said receiving space and that is disposed adjacent to said first lateral side of said front wall, said front wall being formed with an outer surface having a rectangular window area;

a panel-mounting frame movable along said outer surface of said front wall of said housing in a horizontal direction between a normal position, where said panel-mounting frame is fully located in said window area of said outer surface of said front wall of said housing, and an extended position, where a part of said panel-mounting frame extends outwardly from said window area of said outer surface of said front wall of said housing;

an elongate guide roller journalled in said receiving space and disposed parallel and adjacent to said vertical slot in said front wall;

a flexible display panel having a normal display end section fitted in said panel-mounting frame, a coupling end section opposite to said normal display end section and disposed in said receiving space, and an intermediate extended display section interconnecting said normal display end section and said coupling end section, extending through said vertical slot in said front wall and guided around said guide roller;

a biasing unit including a torsion spring disposed in said housing and fastened to said coupling end section of said flexible display panel for biasing said intermediate extended display section to move into said receiving space in said housing; and a positioning unit provided on said panel-mounting frame and said housing for positioning said panel-mounting frame at the normal position and the extended position;

said normal display end section of said flexible display panel serving as a normal display area configured to display an image thereon when said panel-mounting frame is positioned at the normal position, said intermediate extended display section of said flexible display panel extending into said window area of said outer surface of said front wall of said housing when said panel-mounting frame is positioned at the extended position such that said normal display end section and said intermediate extended display section of said flexible display panel serve as an enlarged display area configured to display an image thereon.

2. The electronic device as claimed in claim 1, wherein said flexible display panel is an organics light-emitting display panel.

3. The electronic device as claimed in claim 1, wherein said biasing unit further includes a vertical rod mounted fixedly in said receiving space and spaced apart from said guide roller, said torsion spring being a spiral spring wound on said vertical rod and having a first end fastened to said vertical rod, and a second end opposite to said first end and fastened to said coupling end section of said flexible display panel.

4. The electronic device as claimed in claim 1, wherein said flexible display panel has a minimum bend radius that approximates a curvature radius of said guide roller.

5. The electronic device as claimed in claim 1, wherein said panel-mounting frame has parallel upper and lower frame portions disposed respectively at upper and lower sides of said window area, and a handgrip frame portion interconnecting corresponding ends of said upper and lower frame portions and disposed adjacent to said second lateral side of said front wall.

6. The electronic device as claimed in claim 5, wherein said positioning unit includes:

a pair of resilient engaging members formed respectively on said upper and lower frame portions of said panel-mounting frame, each of said engaging members having a base mounted fixedly on a corresponding one of said upper and lower frame portions, and a stub extending from said base toward said outer surface of said front wall of said housing;

a pair of first engaging grooves formed in said outer surface of said front wall of said housing and disposed adjacent to said first lateral side of said front wall of said housing, said first engaging grooves being disposed respectively adjacent to said upper and lower sides of said window area, said first engaging grooves respectively engaging said stubs of said engaging members when said panel-mounting frame is moved to the normal position; and a pair of second engaging grooves formed in said outer surface of said front wall and disposed adjacent to said second lateral side of said front wall of said housing, said second engaging grooves being disposed respectively adjacent to said upper and lower sides of said window area, said second engaging grooves respectively engaging said stubs of said engaging members when said panel-mounting frame is moved to the expended position.

7. The electronic device as claimed in claim 6, wherein said base of each of said engaging members has a resilient bent rod section connected integrally to said stub.

8. The electronic device as claimed in claim 6, wherein said base of each of said engaging members is hollow such that resilient movement of a corresponding one of said stubs is allowed.

* * * * *